Aug. 15, 1961    J. E. SHOCKROO ET AL    2,996,590
THERMALLY-RESPONSIVE SWITCHES
Filed Sept. 21, 1959    5 Sheets-Sheet 1

Inventors:
James E. Shockroo,
Walter H. Moksu,
by Harold Levine Att'y.

Aug. 15, 1961  J. E. SHOCKROO ET AL  2,996,590
THERMALLY-RESPONSIVE SWITCHES
Filed Sept. 21, 1959  5 Sheets-Sheet 2
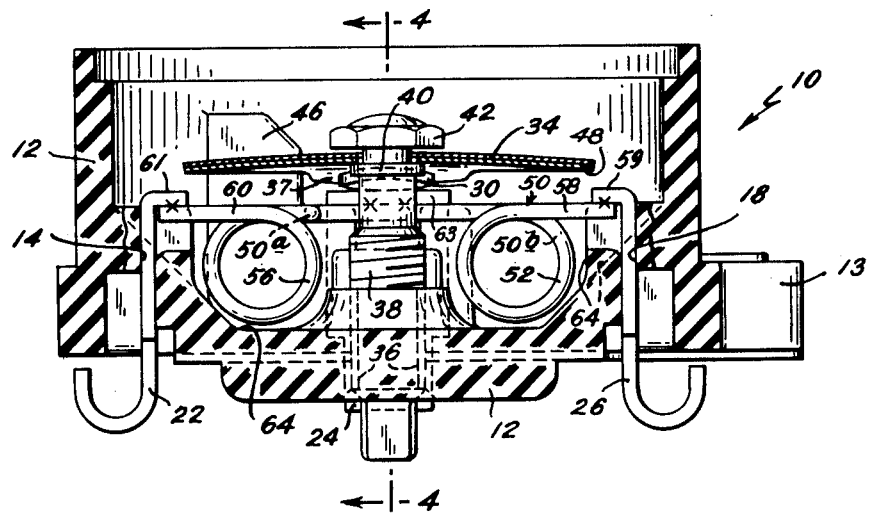
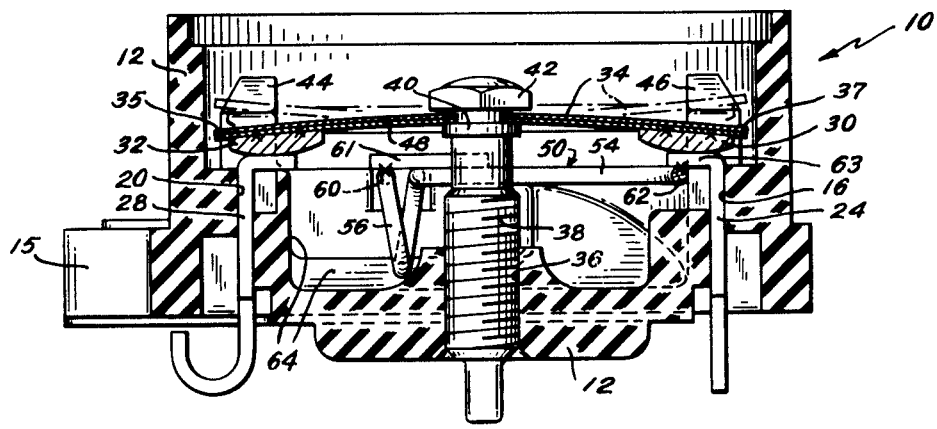
Inventors:
James E. Shockroo,
Walter H. Moksu,
by Harold Levine Att'y.

Inventors:
James E. Shockroo,
Walter H. Moksu,
by Harold Levine Att'y.

Inventors:
James E. Shockroo,
Walter H. Moksu,
by Harold Levine
Att'y.

Inventors:
James E. Shockroo,
Walter H. Moksu,
by Harold Levine Att'y.

United States Patent Office 2,996,590
Patented Aug. 15, 1961

2,996,590
THERMALLY-RESPONSIVE SWITCHES
James E. Shockroo, Norton, and Walter H. Moksu, Attleboro, Mass., assignors to Texas Instruments Incorporated, Dallas, Tex., a corporation of Delaware
Filed Sept. 21, 1959, Ser. No. 841,237
9 Claims. (Cl. 200—122)

This invention relates to thermally responsive switches and with regard to certain more specific features, to thermostatic switches in which heater means are provided by resistance wire or the like. The thermostatic switches of the instant invention are especially adapted for (though not limited to) protection of electric motors and are generally mounted on the motors so as to be subject to both the heat of the motor and to the current actuating the motor to thereby provide so called inherent overheat protection. There are six abnormal motor conditions which can cause the windings of a motor to be overheated and burn out, and they are as follows:

(1) Running overload with or without high ambient or ventilation blocked;
(2) Locked rotor under normal voltage conditions such as caused by mechanical failure of the driven load;
(3) Locked rotor caused by low voltage where decreased torque is insufficient to start the load;
(4) Locked rotor with the main winding only in the circuit, which can result from an open circuit start switch failure or an open circuit in a reversing switch;
(5) Running with both the start and main windings in the circuit, which can result from a start switch failure in the closed position or from low voltage which prevents reaching a switch over speed; and
(6) Locked rotor with the start winding only in the circuit such as that resulting from an open main winding circuit or an open circuit in the reversing switch.

Some present day automatic clothes washers reverse rotation of the motor during operation, which reversal is generally accomplished through a switch in the timer. If the reversing switch fails, it is possible for the motor to be energized with only the main winding on the line or only the start winding on the line, depending on the circuit wiring. Such a switch failure could create two of the abnormal conditions mentioned above.

It is the general object, therefore, of this invention to provide a thermostat which employs heater means such that when properly connected in a motor circuit, will provide complete protection for the motor.

The term "complete protection" as used herein means protecting the start and main windings separately, as well as both of them combined, against each of the above-mentioned conditions, without overprotecting the motor in any of these situations.

The thermostatic switches of the instant invention are constructed with heating means connectable in series with each of the motor windings for heating the operating thermal element so that the actuation thereof will reflect the particular winding conditions and de-energize the motor in the required relatively short time. The heater means which is connected to the main winding (which is generally of a lower current density than the start winding) has a relatively low electrical resistance so that the current passing therethrough will heat the thermal element at a relatively slow rate whereas the heater means connected in series with the start winding (which is usually of a high current density), has a substantially greater resistance so as to heat the thermal element rapidly to cause the latter to quickly effect de-energization of the motor in the required relatively short time.

Among the various objects of the invention therefore, may be noted the provision of a novel, thermostatic electrical switch which is adapted to break an electrical circuit at predetermined temperature and current conditions; the provision of a thermostatic, electrical switch of the class described including a unitary heating means having separate portions or segments which are connectable to separate parts of an electrical circuit, each being responsive to current in separate parts of the electrical circuit, and/or to current in various ones of the windings of a motor to be protected; the provision of an electrical switch of the class described which is particularly adapted, though not necessarily limited to, the use of a motor overload protective device in motors where one of the windings may have a relatively high current density and the other winding may have a relatively low current density; and the provision of a thermostatic, electrical switch of the class described which is simple and economical in construction, assembly and manufacture, and efficient and reliable in operation.

It is another object to provide an electrical switch of the class described for the purposes described which employs a unitary heating means which is compact and permits miniaturized construction of the switch.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the appended claims.

In the accompanying drawings, in which several of the various possible embodiments of the invention are illustrated:

FIG. 3 is a sectional view taken on line 3—3 of FIG. 1;

FIG. 4 is a sectional view taken on line 4—4 of FIG. 3;

Similar reference characters indicate corresponding parts throughout the several views of the drawings.

Figure 1:
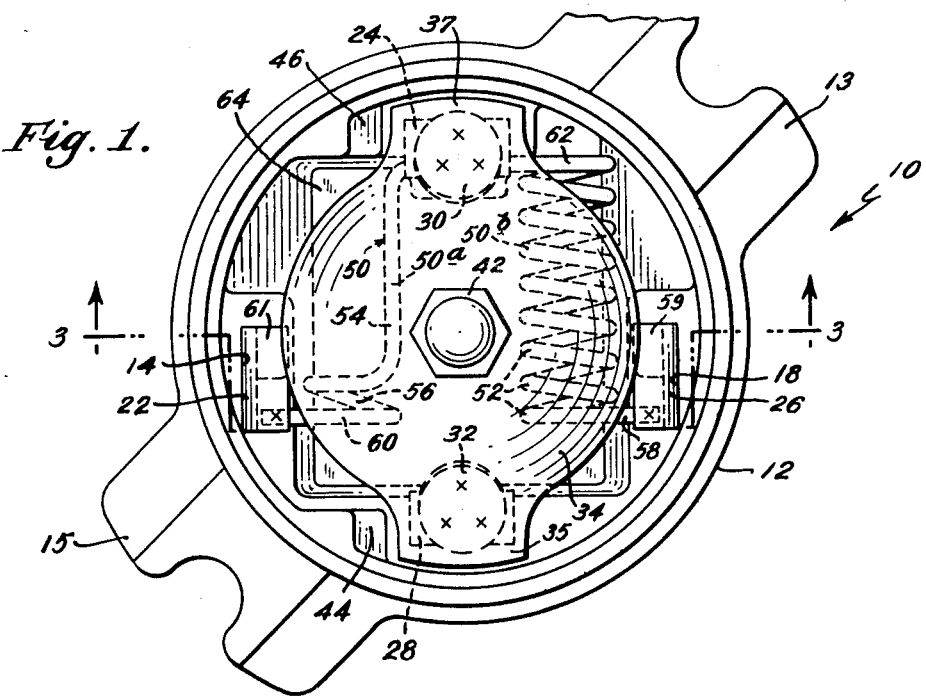
FIG. 1 is a top plan view of a thermostatic switch according to a first embodiment of the invention.
Figure 2:
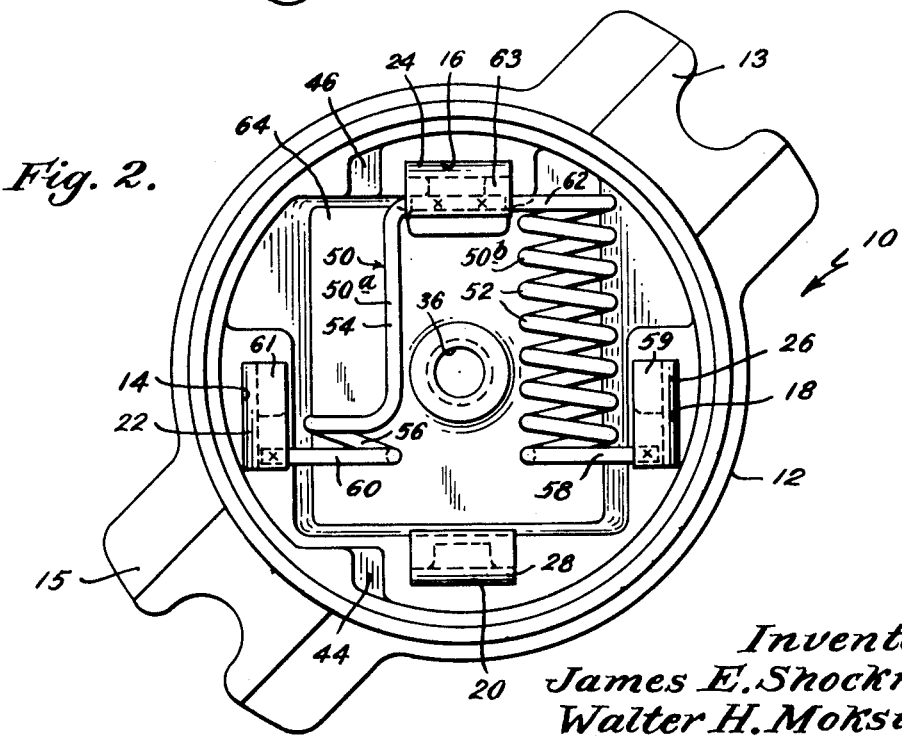
FIG. 2 is a top plan view similar to FIG. 1 with the thermostatic element omitted for the purposes of clarity of illustration.

Dimensions of certain of the parts as shown in the drawings have been modified for the purposes of clarity of illustration.

Referring now to the drawings, there is illustrated in FIGS. 1–7 a thermostatic switch generally referred to by numeral 10, illustrating one embodiment of the instant invention. Thermostatic switch 10 includes a base member 12 formed of one of the conventional electrically insulating plastics, such as a moldable plastic, phenolic, resinous material. Base member 12 is provided with open-ended slots 14, 16, 18 and 20, which slots co-operatively interfit with and respectively mount electrically conductive terminals 22, 24, 26 and 28. Terminals 24 and 28 provide electrical contacts at their upper surfaces for engagement respectively with contacts 30 and 32 which are mounted on thermostatic plate member 34, as shown. Base 12 is provided with an opening 36 in which is threaded an adjusting screw 38. Mounted on the inner end of screw 38 is snap-acting, composite thermostat metal elements 34, which may be, for example, a dished bimetallic snap-acting thermostatic disc of the type shown and described in Spencer Patent 1,448,240 or in the Vaughan et al. Patent 2,317,831. Among the several characteristics of such discs is that when properly formed, they have one position of stable equilibrium when cold and another relatively stable position of equilibrium when hot, the hot and cold positions having opposite curvatures. However, it is within the purview of this invention that nonsnap-acting thermostat elements or plates be used. The thermostat element 34 is mounted on screw 38 by means of proper shoulders or abutments such as 40 and a headed-over end such as 42, all as described in said patents. As thus mounted, relative rotation between the thermal element and adjusting screw 38 is permitted and thus screw 38 may be rotated to adjust the operating temperature of the plate without turning the plate itself. Thermostat plate 34 is guided for assembly into base 12 and is prevented from rotating relative to the base once assembled therein by upstanding projections 44 and 46 provided by base 12 which, as shown, co-operate respectively with ears 35 and 37 of the thermal element 34. Welded to the high-expansion side 48 of thermally responsive element 34 are the diametrically opposite contacts 30 and 32, as described in said Patent 2,317,831. Because these contacts 30 and 32 are welded to thermally responsive element 34, they are in good electrical connection therewith. Their distance apart is such that contacts 30 and 32 make contact respectively with the contact portions of terminals 24 and 28. It will now be noticed that the size of the thermal element 34 is such that substantially all of a heater means 50, provided between the thermal element and the base 12 (which heater means will be described below) is closely covered by it in thermal juxtaposition therewith and therefore the thermostat element is adapted to receive rapidly direct radiation from the heating means, as well as heat by convection. Base member 12 is further provided with ears 13 and 15 for attaching the base to a motor or an energy translating device which is to be protected.

Figure 5:
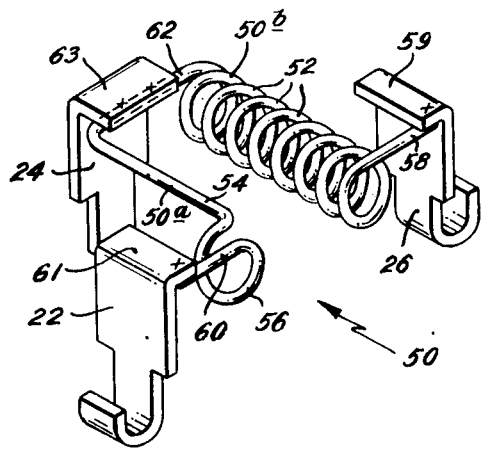
FIGS. 5, 6 and 7 are perspective views of three different modifications of unitary heaters having separate heater portions which are each adaptable for use with the thermostatic switch illustrated in FIGS. 1–4.

Thermostatic switch 10 includes a heating means generally referred to by numeral 50 and best shown in perspective in FIG. 5. Heating means 50 comprises a unitary heating element which may be formed of a resistance wire of conventional heater material and includes one portion or section thereof formed with a plurality of convoluted or coiled portions 52, as best seen in FIG. 5, and a straight portion 54 having a loop 56 adjacent one end, as shown. Single or unitary heater element 50 is electrically connected, as by welding, at one end 58 to the underside of the bent-over portion 59 of terminal 26, and at its other end 60 to the underside of bent-over portion 61 of terminal 22, as best seen in FIGS. 3 and 5. Single, continuous unitary heater element 50 is also electrically connected, as by welding, at a portion 62 thereof, intermediate its ends, to the underside of bent-over portion 63 of terminal 24, as best seen in FIGS. 4 and 5.

In practice, unitary heater element 50 is secured to terminals 22, 24 and 26, as described above, and forms a subassembly therewith such as shown in perspective in FIG. 5. The heater terminal subassembly is then mounted on the base by slidably inserting the terminals into their respective open-ended slots. Unitary heater element 50, when mounted on the base 12, is suspended therein between the bottom of the base 12 and the thermostatic element or disc 34 in recessed portion 64 and is not in contact with either the base or the thermal element. This arrangement avoids possible short-circuiting between the thermal element and the heating element and avoids the necessity for employing electrical insulation and also avoids possible burn-out of the casing or base 12 and attendant heat loss while mounting the heater element in good thermal heat-transfer relation to the disc 34. The fact that the heating element lies between the thermal disc 34 and the base is advantageous in that there is no physical contact therebetween during the snap action or movement in response to predetermined temperature and current conditions of the disc 34 and closer thermal juxtaposition of and better heat transfer between, the heater to the disc is permitted without the necessity of employing heat insulating electrical insulation therebetween. Further, with this arrangement, a cover member for the base 12 is not necessary but may be desirable in certain applications.

Unitary heater element 50, when electrically connected as described above, to the three terminals 22, 24 and 26, provides a heating element with two separate portions or segments generally referred to in the drawings as 50a and 50b. Portions 50a and 50b are generally of different electrical resistance and are each respectively connectible in series with a respective one of two motor windings, as will be described in greater detail below.

Figure 6:
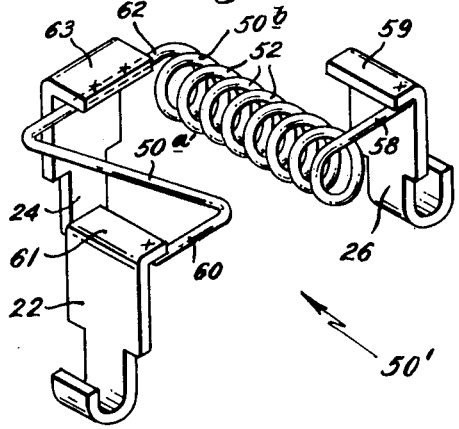
Figure 7:
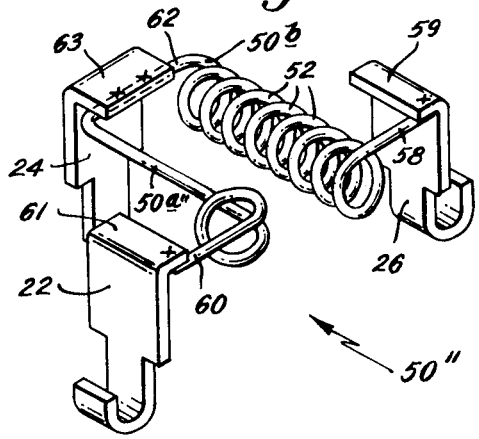

FIGS. 6 and 7 are respectively variations of the unitary heating element with a plurality of heating segments or sections such as illustrated in FIG. 5. The unitary heating elements shown in FIGS. 6 and 7 are formed of the same heater resistance wire and diameter thereof as that employed for the heater of FIG. 5 and differ mainly in the resistance of portion 50a of the unitary heating element. As shown in FIG. 6, the heater portion 50a' of heater 50' constitutes a different configuration than that of section 50a, and provides a different length of heater resistance wire and consequently provides a different electrical resistance than that of section 50a of heater 50, shown in FIG. 5. Section 50a'' of heater 50'' shown in FIG. 7 illustrates yet another variation in configuration of portion 50'' and provides yet a different length of heater resistance wire than that provided by sections 50a and 50a' and consequently, provides a different resistance.

Thus, it can be seen from the above that the resistances may be varied simply by merely varying the particular shape or the number of loops involved and the size of the loop involved and also, of course, by varying the diameter and/or composition of the wire.

Although portion 50b of heater 50 has been illustrated as having circular convolutions or loops, it should be understood that such loops may be elliptical in form or of other shape within the practice of the instant invention.

Figure 11:
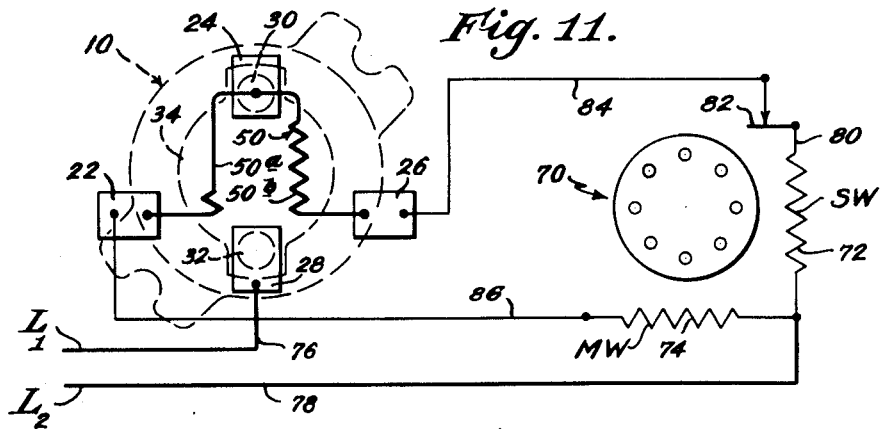
FIGS. 11 and 12 are exemplary schematic wiring diagrams respectively for the thermostatic switches illustrated in FIGS. 1–7 and FIGS. 8–10, in combination with a split-phase electrical motor.

Referring now to the circuit diagram of FIG. 11, the thermostatic switch 10 is schematically illustrated in an exemplary circuit with a motor 70 having an auxiliary start or phase winding 72 and a main or running winding 74. The start winding 72 and main winding 74 are respectively indicated in FIG. 11 by the letters SW and MW. One power supply line, $L_1$, is connected by conductor 76 to terminal 28. The other side of the power supply line, $L_2$, is connected by conductor 78 to the common connection between the start winding 72 and the main winding 74 of the motor indicated generally by numeral 70. The other end of the start winding 72 is connected by conductor 80 to a start winding disconnect switch (indicated schematically by reference numeral 82) and then by conductor 84 to terminal 26. The other end of the main or running winding 74 is connected by conductor 86 to terminal 22.

As thus connected, it will be observed that current in the starting winding flows from one side, $L_2$, of the power supply line through conductor 78, start winding 72, conductor 80, switch 82, conductor 84, terminal 26, heating portion 50b of unitary heater 50, terminal 24, contact 30, thermal element 34, contact 32, terminal 28, conductor 76 and to $L_1$, the other side of the power source. Current through the running or main winding 74 flows from $L_2$, conductor 78, through the main winding 74, conductor 86, terminal 22, portion 50a of unitary heating element 50, terminal 24, contact 30, thermally responsive element 34, contact 32, terminal 28 and then by conductor 76 to L₁, the other side of the power source. From the above, it will be observed that portion 50a of unitary heating element 50 is electrically connected in series with the main winding 74 and portion 50b, which would be of higher resistance than that of portion 50a, is electrically connected in series with the start or phase winding 72. Both portions 50a and 50b of unitary heating element 50 and the respective windings are electrically connected in series with the thermal element 34.

The operation of the device in the exemplary circuit described above is as follows:

Under normal operating conditions of the motor 70, the heat generated by the current passing through the thermally responsive element 34 and heating portions 50a and 50b of unitary heating element 50, together with the heat of the motor, will not be sufficient to raise the temperature of the thermally responsive element 34 to the point where it snaps to its position of opposite concavity (if it is the snap-acting type) or moves a distance (if it is the creep-type) to open the electrical contacts 30 and 32 to de-energize the motor. If, however, the motor is so heavily overloaded that the rotor cannot turn, then the heavy starting and running winding currents will influence their respective heater portions 50b and 50a as well as the thermal element 34 to cause the thermal element to move to open the circuit to both windings, thus protecting the motor windings from overheating. If, on the other hand, the motor has been running and the starting winding is not in the circuit and then the motor becomes overloaded, or there is a locked rotor condition with the main winding only in the circuit which may have resulted from open circuit start switch failure or open circuit in the reversing switch, the excess current in the running winding 74 will raise the temperature of heater portion 50a as well as that of the thermal element 34, and (according to the calibration of the thermostat) the effect of the heater portion 50a on thermal element 34 will, after a time, be sufficient to cause thermal element 34 to move to open the circuit before the windings are damaged.

Another abnormal motor condition mentioned above is that condition where the motor is running, but at such a low speed that both the start winding 72 and the running winding 74 are in the circuit, which might result from a start switch failure in the closed position or low voltage which prevents reaching a switch-over speed. If the motor should operate in this fashion, then it will be observed that the relatively heavy current in the starting winding again has a rapid direct influence on the thermal element 34, both because it traverses it and also because this current rapidly heats heater portion 50b of single unitary heater 50, which is of high resistance and being mounted close to the thermal element 34 and covered by it, rapidly heats the thermal element to the contacts-separating point. This rapid heating of the thermal element to the contacts-separating point is, of course, also aided by the heat which is derived through heater portion 50a by the run winding current flowing therethrough. The unitary heater, with its separate portions 50a and 50b in the thermostat 10, also renders the thermostat effective in a sixth abnormal motor condition, mentioned above. This condition involves a locked rotor with the start winding 72 only in the circuit such as might result from an open main winding circuit or an open circuit in a reversing switch. In this condition, the relatively heavy current in the start winding again has a rapid direct influence on the thermal element 34, as described above in the previously mentioned condition, in that it traverses the thermal element 34 and also because this relatively heavy excess current rapidly heats heating portion 50b of single unitary heater 50, which is of relatively high resistance, which also because it is mounted close to the thermal element and covered by it, rapidly heats the thermal element 34 to the contacts-separating point. With the arrangement described above, the influence of the temperature of each of heater portions 50a and 50b is very quickly felt by the thermal element 34. Thus, the motor will be protected in all of the abnormal situations outlined above without being overprotected in any of these situations.

In the above description, it has been specified that heater portion 50b is connected to the starting winding 72 of the motor and that heating portion 50a of single, unitary heater 50 is connected to the running winding 74. This is merely by way of example and not by limitation. In the usual split-phase electrical motor, the starting winding has the greatest current density, and it is for this reason that the above exemplary circuit connection is employed for descriptive purposes. In all cases, the heater portion 50b, which has the higher electrical resistance of the two heating portions, should be connected to that winding which, under the conditions at which it is desired to protect the motor, has the greatest current density.

The unique unitary heater provides many unobvious and beneficial advantages. By providing a unitary heater with two different segments or portions of different resistances which are respectively connectable in series with the windings of a motor, it is possible to provide each of the portions with desired resistance in a relatively compact space, which affords a maximum radiation area adjacent a thermal element for good heat-transfer relation and affords a simple and inexpensive miniaturized construction. The use of two separate heaters in such a construction would be considerably more expensive and would, in many cases, require greater space for a given desired electrical resistance. With the single unitary heater, only three points of connection are necessary to provide the two separate heating segments or portions and only a single manipulation is necessary for assembly of the heating element which consequently results in reduced cost and simplification of production.

Figure 8:
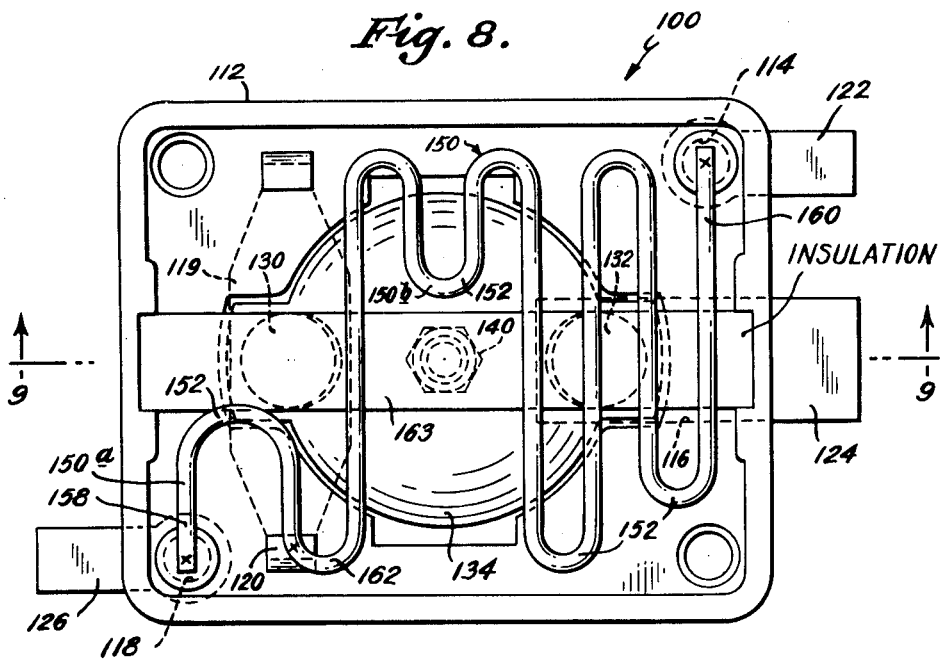
FIG. 8 is a top plan view of a thermostatic switch according to a second embodiment of the instant invention.
Figure 9:
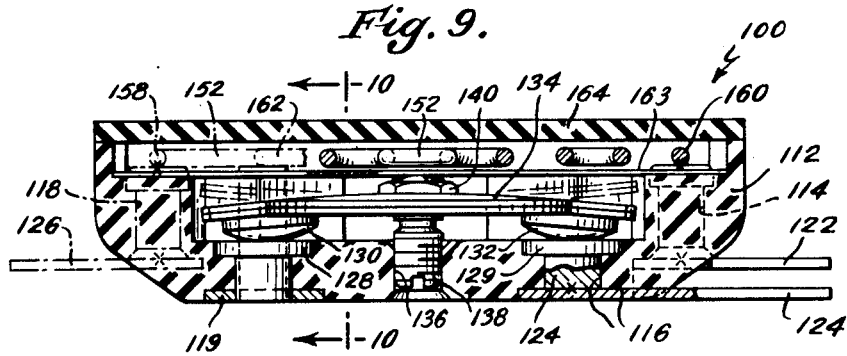
FIG. 9 is a sectional view taken on line 9—9 of FIG. 8.
Figure 10:
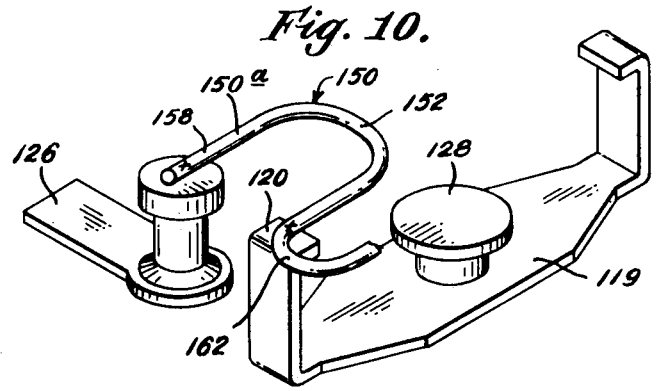
FIG. 10 is a perspective view of certain parts of the switch illustrated in FIG. 8.

Illustrated in FIGS. 8, 9 and 10 is another embodiment of the thermostatic switch of the instant invention and indicated generally by numeral 100. Thermostatic switch 100 includes a base member 112 formed of one of the conventional electrically insulating plastics such as a moldable, phenolic, resinous material. Base 112 may also be formed of a molded ceramic material. Base member 112 is provided with a plurality of open-ended slots or apertures 114, 116 and 118, which slots or apertures co-operatively interfit with and respectively mount electrically conductive terminals 122, 124 and 126. Thermostatic switch 100 also includes an elongated terminal contact element 119, which is best seen in perspective in FIG. 10. Element 119 is mounted in suitable slots and apertures on base 112, as shown. Element 119 provides an upstanding, bent-over terminal portion 120, to which a heater element is secured, as will be described in greater detail below. Element 119 also provides, at a portion intermediate its ends, a contact 128. Terminal 124 provides a contact 129, as best seen in FIG. 9. Contacts 128 and 129 are engageable respectively with contacts 130 and 132, both of which are mounted on thermostatic plate member 134, as shown. Base 112 is provided with an opening 136 in which is threaded an adjusting screw 138. Mounted on the inner end of screw 138 is a snap-acting, composite, thermostat metal element 134, which may be, for example, a dished bimetallic snap-acting thermostatic disc such as snap-acting thermostatic disc 34 described above. Snap-acting thermostat element 134 is mounted on screw 138 by means of proper shoulders or abutments such as 140 and in a manner such as described above and as described in the Spencer and Vaughan patents referred to above with regard to the thermostatic switch of FIGS. 1–7. Thermostatic element 134 is mounted in a complementary-shaped recess formed in base 112, which facilitates alignment during assembly and also prevents relative rotation between the thermal element and the base, when in final assembled relation. Adjusting screw 138 may be rotated to adjust the operating temperature in a manner similar to that described above for thermostatic switch 10.

Thermostatic switch 100 also includes a heating means generally referred to by numeral 150, as best seen in plan in FIG. 8. Heating means 150 comprises a unitary heating element of serpentine form. Included in the serpentine outline of the unitary heating element 150 is a plurality of reentrant loops, repeating loops or hairpin turned portions 152, which are or may be of varying length, depending on the value of electrical resistance required. Unitary heating element 150 may be formed of a resistant wire of conventional heater material.

Single, unitary heater element 150 is electrically connected, as by welding, at one end 158 to the upper portion of terminal 126, and at its other end 160 to the upper side of terminal 122, as best seen in FIGS. 8 and 9.

Single, unitary heater element 150 is also electrically connected, intermediate its ends, as by welding, at a portion 162 thereof, to the upper portion of elevated bent-over portion 120 of element 119, as best seen in FIGS. 8 and 10.

Unitary heater element 150, when mounted on the base and electrically secured to the terminals, as described above, is suspended directly above the thermostatic element or disc 134, as best seen in FIG. 9, and is not in contact with either the base or the thermal element. This arrangement avoids possible short-circuiting between the thermal element and the heating element, and also avoids possible burnout of the casing or base 112 and attendant heat loss while mounting the heater element in good thermal heat transfer relation or thermal juxtaposition with the disc 134. As best seen in FIG. 9, the heating element lies sufficiently above thermal element 134 so that there is no physical contact therebetween during the snap action or movement in response to predetermined temperature and current conditions of the disc 134 and relatively close thermal juxtaposition of the heater to the disc is permitted. An electrically insulating strip or layer 163 formed, for example, of mica may be disposed between thermal element 134 and heater 150, as best seen in FIG. 9. The open end of base member 112 may be closed with a cover member 164 and secured thereto in any known, convenient manner.

Unitary heater element 150, when electrically connected as described above, provides a unitary heating element with two separate portions or segments generally referred to in the drawings as 150a and 150b. Portions 150a and 150b are generally of different electrical resistance and are each respectively connectable with a respective one of two motor windings, as will be described in greater detail below.

The resistance in each of segments 150a and 150b may be varied by merely varying the length of the respective loops or the number of loops or hairpin turned portions and also by varying the diameter or cross sectional dimension and/or the composition of heater material employed.

Figure 12:
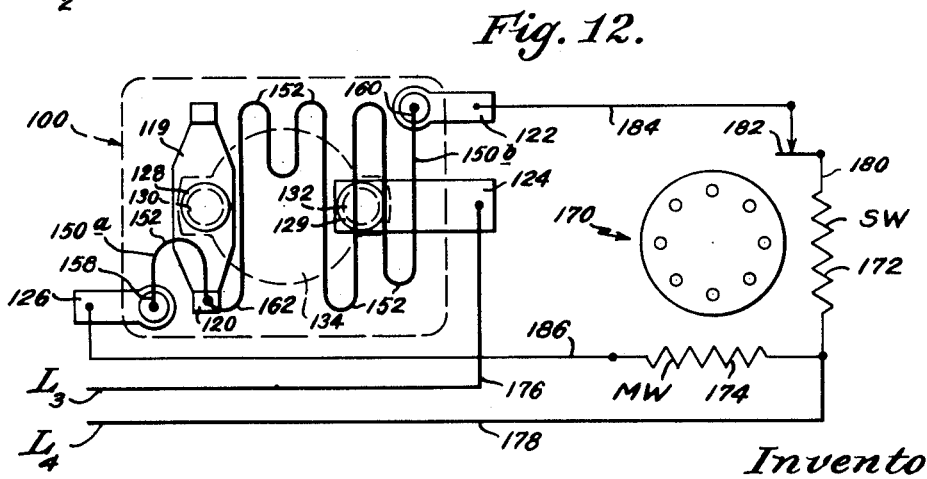

Referring now to the circuit diagram of FIG. 12 wherein the thermostatic switch 100 is schematically illustrated in an exemplary circuit with a motor 170 having an auxiliary start or phase winding 172 and a main or running winding 174, the starting or phase winding 172 and the main winding 174 are respectively indicated in FIG. 12 by the letters SW and MW. One power supply line, $L_3$, is connected by conductor 176 to terminal 124. The other side of the power supply line, $L_4$, is connected by conductor 178 to the common connection between the start winding 172 and the main winding 174 of the motor indicated generally by the numeral 170. The other end of the start winding 172 is connected by conductor 180 to a start winding disconnect switch (indicated schematically by reference numeral 182) and then by conductor 184 to terminal 122. The other end of the main or running winding 174 is connected by conductor 186 to terminal 126.

As thus connected, it will be observed that current in the starting winding flows from $L_4$, one side of the power supply line through conductor 178, start winding 172, conductor 180, switch 182, conductor 184, terminal 122, heating portion or segment 150b of unitary heater 150, terminal 120, contact 128, contact 130, thermal element 134, contact 132, contact 129, terminal 124, conductor 176 and to $L_3$, the other side of the power source.

Current through the main or running winding 174 flows from $L_4$, conductor 178, through the main winding 174, conductor 186, terminal 126, portion 150a of unitary heating element 150, terminal 120, contact 128, contact 130, thermal element 134, contact 132, contact 129, terminal 124, and then by conductor 176, to $L_3$, the other side of the power source.

From the above, it will be observed that portion 150a of unitary heating element 150 is electrically connected in series with the main winding 174 and portion 150b, which would be of higher resistance than that of portion 150a, is electrically connected in series with the start or phase winding 172. Both portions 150a and 150b of unitary heating element 150, and the respective windings are electrically connected in series with the thermal element 134.

The operation of thermostatic switch 100 in the exemplary circuit of FIG. 12 described above, is substantially the same as that described for thermostatic switch 10, described above.

Thermostatic switch 100, with its unitary heating element 150, provides substantially all of the unusual advantages and unobvious beneficial results described above for thermostatic switch 10 and additionally provides all of the advantages of a miniaturized wafer-like switch construction.

It should be understood that although a round wire is illustrated in the drawings as being exemplary of a material of which the heating element may be made, that this may be a strip, ribbon or the like. The term "wire" is used herein as characterizing each of these heater forms. This applies to the single, unitary heaters for both thermostatic switches 10 and 100.

It should also be understood that the thermally responsive switch of the instant invention, with the single, unitary heater arrangement, is susceptible to diverse applications in motor protective circuits other than that illustrated by way of example in the drawings. For example, the switch of the instant invention with its single unitary heater could be employed with multispeed, dual voltage, or other electric motors having more than two windings. Further, although only two heating segments or portions of the single unitary heater have been illustrated as an exemplary embodiment, a greater number of heating portions may be provided in the practice of the instant invention. Such additional heater segments or portions can be electrically connected in separate circuits with additional motor windings, as may be required in the practice of the instant invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

We claim:

1. A switch adapted for protection of a motor having at least two windings, said switch comprising a base; a pair of electrical contacts; thermally responsive means connected to open said contacts at predetermined temperature and current conditions; at least three terminals on said base; a single continuous unitary heating element arranged in thermal juxtaposition with said thermally responsive means; said heating element comprising first and second portions, said first and second portions of said heating element being respectively electrically connected to first and second ones of said terminals, said heating element being further electrically connected and secured at a third portion thereof to the third one of said terminals thereby separating said single continuous unitary heating element into two segments, each one of said segments being electrically connectable in series with a respective one of said motor windings.

2. The switch as set forth in claim 1 and wherein said segments are of different electrical resistances.

3. A switch comprising a base; thermally responsive means on said base; at least three terminals on said base; a single continuous heating element arranged in thermal juxtaposition with said thermally responsive means, said heating element comprising first and seconds portions, said first and second portions of said heating element being respectively electrically connected to first and second ones of said terminals, said heating element being further electrically connected and secured at a third portion thereof to the third one of said terminals, said thermally responsive means being adapted to open and close a circuit to said third terminal.

4. A thermostatic switch adapted for protection of a motor having a phase and main winding, said switch comprising a base; snap-acting thermally responsive means on said base; at least four spaced terminals on said base; a single continuous unitary heating element arranged in thermal juxtaposition with said thermally responsive means, said unitary heating element comprising first and second portions said first and second portions of said unitary heating element being respectively electrically connected to first and second ones of said terminals, said heating element being further electrically connected and secured at a third portion thereof intermediate said first and second portions to the third one of said terminals, said third terminal and the fourth one of said terminals each being provided with a contact each adapted for engagement with a respective one of a pair of contacts mounted for movement in response to movement of said thermally responsive means to open and close a circuit therebetween at predetermined temperature and current conditions, said first and second terminals being respectively electrically connectable in series with said phase and main windings and said fourth terminal being electrically connectable to one side of a power source.

5. The switch as set forth in claim 4 and wherein said first portion of said heating element has a higher electrical resistance than said second portion.

6. The switch as set forth in claim 4 and wherein said unitary heater element is disposed intermediate said base and thermally responsive means.

7. The switch as set forth in claim 4 and wherein said thermally responsive means is disposed intermediate unitary heater element and said base.

8. In combination an electrical energy translating device having first and second windings, with said first winding having, during operating conditions, a greater current density than said second winding; and a thermostatic switch for protecting both of said windings against overheating, said switch comprising a base; thermally responsive means on said base; at least four spaced terminals on said base; a single continuous unitary heating element arranged in thermal juxtaposition with said thermally responsive means, said unitary heating element comprising first and second portions, said first and second portions of said heating element being respectively electrically connected to first and second ones of said terminals, said heating element being further electrically connected and secured at a third portion thereof intermediate said first and second portions to the third one of said terminals, said third terminal and the fourth one of said terminals each being provided with a contact each adapted for engagement with a respective one of a pair of contacts mounted for movement in response to movement of said thermally responsive means to open and close a circuit therebetween at predetermined temperature and current conditions, said first and second terminals being respectively electrically connected in series with said first and second windings and said fourth terminal being electrically connectable to one side of a power source, and said first portion of said heater element having a greater electrical resistance than said second portion.

9. A switch comprising a base; thermally responsive means on said base; at least three terminals on said base; each of said terminals being substantially similar in construction; a single continuous heating element arranged in thermal juxtaposition with said thermally responsive means, said heating element comprising first and second portions, said first and second portions of said heating element being respectively electrically connected to first and second ones of said terminals, said heating element being further electrically connected and secured at a third portion thereof to the third one of said terminals, said thermally responsive means being adapted to open and close a circuit to said third terminal.

References Cited in the file of this patent
UNITED STATES PATENTS

| | | |
|---|---|---|
| 2,700,714 | Epstein | Jan. 25, 1955 |
| 2,768,342 | Vaughan et al. | Oct. 23, 1959 |
| 2,901,575 | Clarke | Aug. 25, 1959 |

UNITED STATES PATENT OFFICE
CERTIFICATION OF CORRECTION

Patent No. 2,996,590                                     August 15, 1961

James E. Shockroo et al.

It is hereby certified that error appears in the above numbered patent requiring correction and that the said Letters Patent should read as corrected below.

Column 3, line 6, for "elements" read -- element --; column 8, line 22, for "portions" read -- portion --; column 10, line 4, after "intermediate" insert -- said --.

Signed and sealed this 24th day of April 1962.

(SEAL)
Attest:

ESTON G. JOHNSON
Attesting Officer

DAVID L. LADD
Commissioner of Patents